United States Patent
Argue et al.

(10) Patent No.: US 9,147,197 B2
(45) Date of Patent: Sep. 29, 2015

(54) DETERMINING POINT OF SALE ADVERTISEMENT EFFECTIVENESS

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 13/719,085

(22) Filed: Dec. 18, 2012

(65) Prior Publication Data

US 2014/0172599 A1 Jun. 19, 2014

(51) Int. Cl.
G06Q 30/00 (2012.01)
G06Q 30/02 (2012.01)
G06Q 10/00 (2012.01)
G06Q 20/00 (2012.01)

(52) U.S. Cl.
CPC ................................. *G06Q 30/0242* (2013.01)

(58) Field of Classification Search
None
See application file for complete search history.

(56) References Cited

U.S. PATENT DOCUMENTS

| 5,515,270 | A | 5/1996 | Weinblatt | |
|---|---|---|---|---|
| 6,298,330 | B1 | 10/2001 | Gardenswartz | |
| 6,484,146 | B2 | 11/2002 | Day | |
| 8,676,644 | B2 | 3/2014 | Merriman | |
| 2005/0187819 | A1* | 8/2005 | Johnson | ........................ 705/14 |
| 2007/0038516 | A1 | 2/2007 | Apple | |
| 2007/0226055 | A1 | 9/2007 | Belanger | |
| 2008/0294518 | A1 | 11/2008 | Weiss | |
| 2009/0063274 | A1* | 3/2009 | Dublin et al. | ................... 705/14 |
| 2009/0106058 | A1 | 4/2009 | McAfee | |
| 2009/0265243 | A1 | 10/2009 | Karassner | |
| 2009/0276309 | A1* | 11/2009 | Otto et al. | ................. 705/14.25 |
| 2009/0299851 | A1 | 12/2009 | Hedarchet | |
| 2010/0257017 | A1 | 10/2010 | Mixson | |
| 2010/0318419 | A1 | 12/2010 | Vieri | |
| 2011/0035288 | A1* | 2/2011 | Clyne | ........................ 705/14.71 |
| 2011/0087546 | A1* | 4/2011 | Fordyce et al. | ............ 705/14.53 |
| 2011/0137716 | A1 | 6/2011 | Reuthe | |
| 2011/0191164 | A1* | 8/2011 | Reichert | .................... 705/14.43 |
| 2011/0231238 | A1 | 9/2011 | Khan | |
| 2012/0059702 | A1* | 3/2012 | Yoder et al. | ................ 705/14.17 |
| 2012/0117467 | A1* | 5/2012 | Maloney et al. | ............. 715/273 |
| 2012/0191527 | A1* | 7/2012 | Reichert et al. | ............ 705/14.41 |
| 2012/0310838 | A1* | 12/2012 | Harris et al. | .................... 705/65 |

FOREIGN PATENT DOCUMENTS

| WO | WO9114984 a1 | 10/1991 |
|---|---|---|
| WO | WO9304449 A1 | 3/1993 |

* cited by examiner

*Primary Examiner* — Ig T An
(74) *Attorney, Agent, or Firm* — Howard & Howard Attoneys PLLC

(57) ABSTRACT

Systems and methods are disclosed herein for characterizing the effectiveness of an advertisement displayed at a point of sale (POS). A transaction reported by a POS may identify a consumer and a transaction time as well of details such as a product purchased. The transaction time may be compared to an advertising schedule to identify an advertisement displayed adjacent the POS at the time of purchase. Transactions subsequent to identified advertisements may be analyzed to identify any increase in purchasing activity for an advertised product. Increases in purchasing activity and impressions identified in this manner for the general population or demographic groups may be aggregated to characterize an advertisement's effectiveness. Video data or transaction frequency data may be used to estimate an in-queue time for a customer in order to identify advertisement impressions.

15 Claims, 7 Drawing Sheets

DETERMINING POINT OF SALE ADVERTISEMENT EFFECTIVENESS

BACKGROUND

1. Field of the Invention

This invention relates to systems and methods for tracking the effectiveness of advertisements.

2. Background of the Invention

Electronic advertisement displays are very common adjacent point of sale (POS) in many stores. These advertisements take advantage of the time a shopper spends in a queue to make advertising impressions. Often these displays will display full video advertisements with audio. The advertisements may be displayed along with content that may be of interest or entertaining to consumers. Although these displays are well positioned to generate impressions among likely shoppers, it is nearly impossible to analyze their effectiveness. In particular, since the target audience may be small, any increase in sales that can be attributed to a displayed advertisement may be difficult to detect or attribute to a displayed advertisement.

The systems and methods disclosed herein provide novel approaches to track the effectiveness of in-store advertisements.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
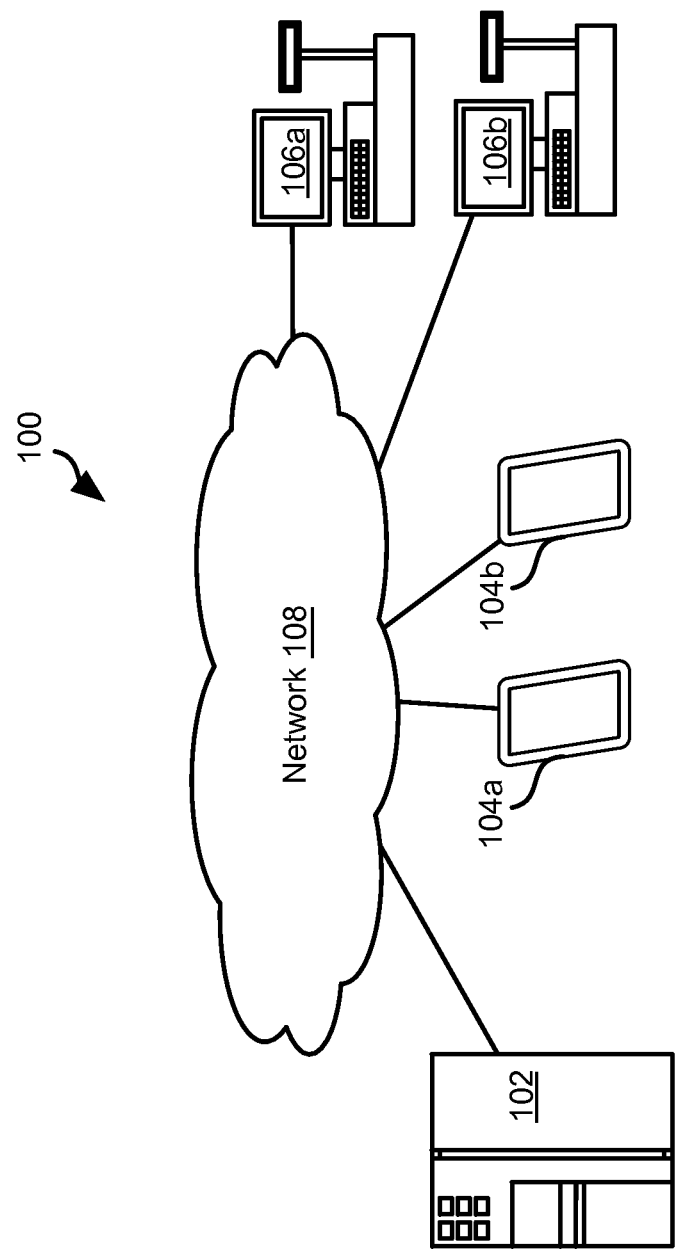
FIG. 1 is a schematic block diagram of a system for performing methods in accordance with embodiments of the invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

FIG. 1 illustrates a system 100 in which methods described hereinbelow may be implemented. The system 100 may include a server system 102 that may be embodied as one or more server computers each including one or more processors that are in data communication with one another. The server system 102 may be in data communication with one or more user computers 104a, 104b and one or more point of sale (POS) devices 106a, 106b. In the methods disclosed herein, the user computers 104a, 104b are advantageously mobile devices such as a mobile phone or tablet computer. In some embodiments, some or all of the methods disclosed herein may be performed using a desktop computer or any other computing device as the user computer 104a, 104b. For purposes of this disclosure, discussion of communication with a user or entity or activity performed by the user or entity may be interpreted as communication with a computer 104a, 104b associated with the user or entity or activity taking place on a computer associated with the user or entity. A POS 106a-106b may be located within a store and may be part of a POS network. In some embodiments, a POS 106a, 106b may be operable to process online transactions. In some embodiments, separate computers of the server system 102 may handle communication with the user computers 104a, 104b and POS 106a, 106b.

Some or all of the server 102, user devices 104a, 104b, and POS 106 may communicate with one another by means of a network 108. The network 108 may be embodied as a peer-to-peer wireless connection between devices, a connection through a local area network (LAN), WiFi network, the Internet, or any other communication medium or system.

Figure 2:
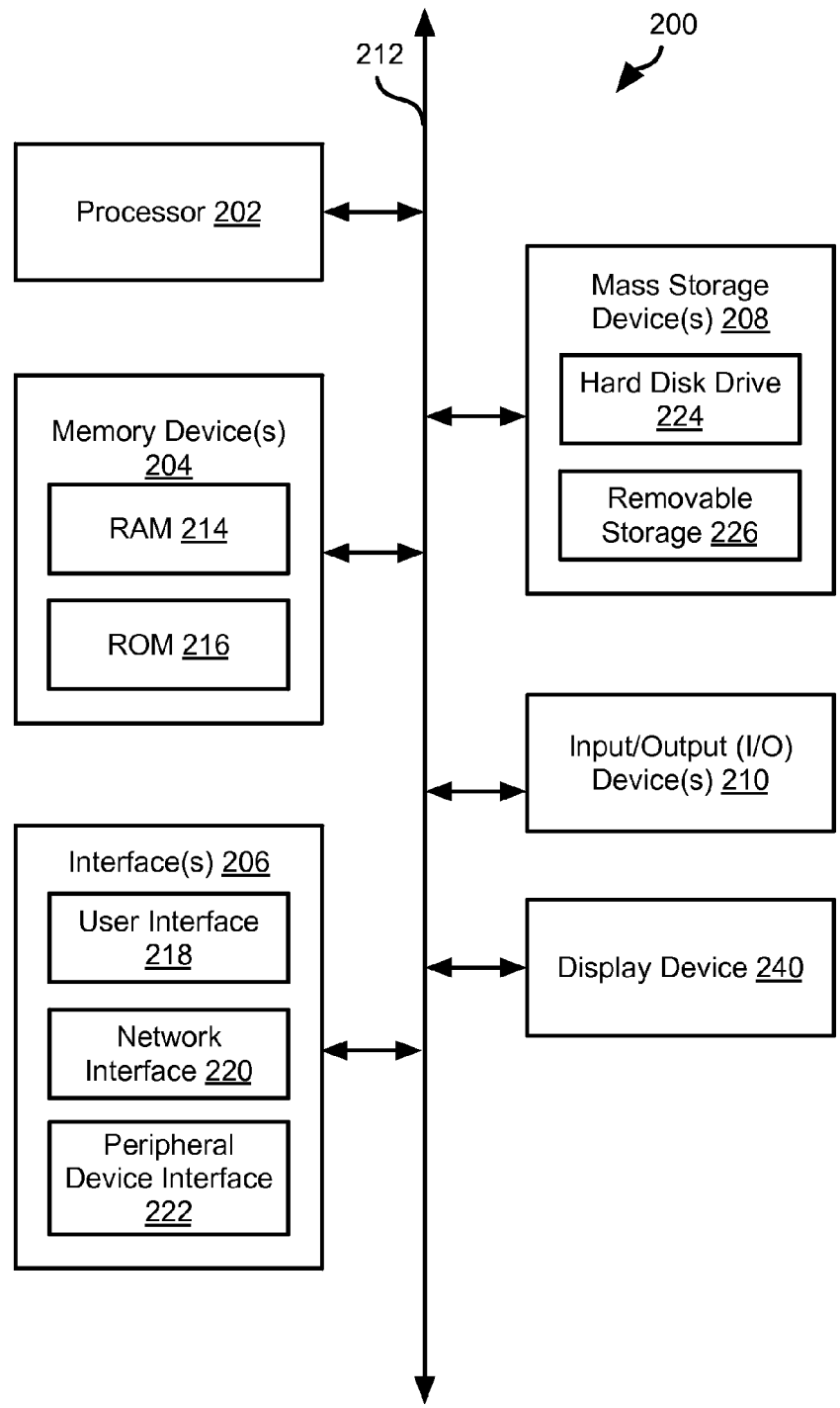
FIG. 2 is a block diagram of a computing device suitable for implementing embodiments of the invention.

FIG. 2 is a block diagram illustrating an example computing device 200. Computing device 200 may be used to perform various procedures, such as those discussed herein. A control module 100 and cart control module 124 may include some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3A:
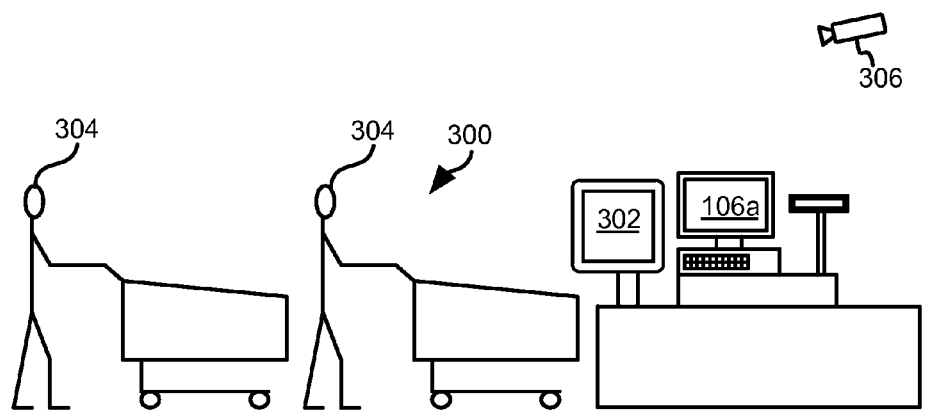
FIGS. 3A and 3B are schematic diagrams of POS stations in which methods in accordance with the invention may be implemented.
Figure 3B:
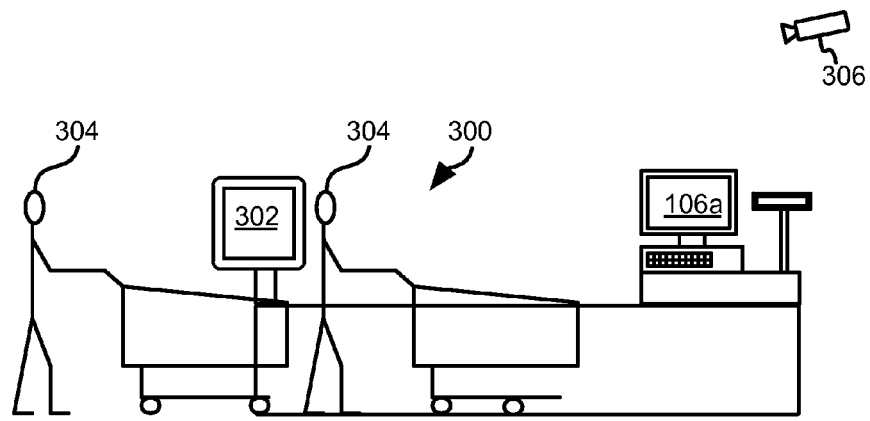

FIG. 3A illustrates a POS station that may be located in a store. The POS station may include a POS 106a and a video display device 302 positioned in view of shoppers 304 queued to pay for purchases at the POS 106a. The video display device 302 may have some or all of the attributes of the computing device 200. In particular, the video display 304 may have sufficient logical capacity to receive advertisements and advertising schedule and display the advertisements according to the schedule. In some embodiments, a video display device 302 may only display advertisements in the form of still images that are changed from time to time, accordingly a reduced processing capacity may be required for the video display device 302. In some embodiments, a camera 306 may be positioned and oriented to capture video of shoppers 304 within view of the video display device 302. The camera 306 may capture video data or periodically capture still image. The camera 306 may additionally function as a security camera. Image data captured by the camera 306 may have a time stamp associated therewith, such as by means of a date and time imposed on captured image data either by the camera 306 or by a device that receives and/or archives the output of the camera 306. Referring to FIG. 3B, the video display device 302 may be at various positions relative to a corresponding POS 106a. For example, at many POS stations 300, displays of magazines, candy, and other products may be positioned between a video display device 302 and the corresponding POS 106a.

Figure 4:
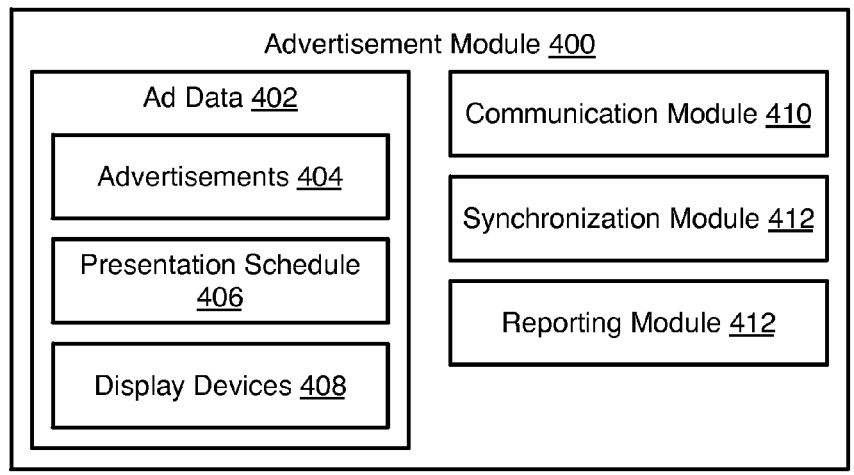
FIG. 4 is a schematic block diagram of an advertisement module in accordance with an embodiment of the invention.

FIG. 4 illustrates an advertisement module 400. The advertisement module 400 may be executed by a server, such as a server system 102a associated with a merchant that also operates in-store POS stations 300. Alternatively, a separate entity may provide the advertisement module 400 in order to provide content to video display devices. The separate entity may additionally provide the video display device 302 and may compensate a merchant for the opportunity.

In either case, an advertisement module 400 may include advertising data 402, which may including a plurality of advertisements 404 and one or more presentation schedules 406. Presentation schedules 406 may include, for example, a list of times and an advertisement to be displayed at that time. Different presentation schedules 406 may be generated for different geographic areas, classes of store, store chain, different sections of a store, or for any other division. The advertisement data 402 may additionally include display device data 408 that includes one or more of display device identifiers, address data enabling network communication with the display devices, a contracting entity that is hosting a display device, or any other information used to access a display device and select advertisements for a display device.

Advertisement module 400 may additionally include a communication module 410. The communication module 410 may initiate and conduct network communication with the display devices 302 or with some other device that uploads advertisements to one or more display devices 302.

A synchronization module 412 may be configured to ensure that a display device 302 is provided with one or both of current advertisements and a current advertising schedule. The synchronization module 412 may be invoked manually by an operator of an advertisement module 400. Alternatively or additionally the synchronization module 412 may be programmed to send one or both of updated advertisements and an updated advertisement schedule to a display device 302 upon detecting a change to advertisement data 402 corresponding to the display device 302.

The advertisement module 400 may additionally include a reporting module 412. Inasmuch as an advertising schedule is provided by the advertisement module 400 to the display devices 302, the advertisement module 400 may report what advertisement played on a particular display device at a particular time. Accordingly, a reporting module 412 may receive requests that identify a time and a location or identifier of a display device 302 and respond with data such as an identifier of a product that was advertised at that time, a brand that was advertised, a class of product, a target demographic for an advertisement displayed at that time, or any other information that is descriptive of advertising displayed on the display device 302 and at the time specified in the request. Alternatively or additionally, a reporting module 412 may respond to requests for all advertisement and scheduling data relevant to all display devices 302, or subset of display devices 302, with the requested information. The requesting device or module may then use this data to determine what advertisement was displayed on a given display device 302 at a given time.

Figure 5:
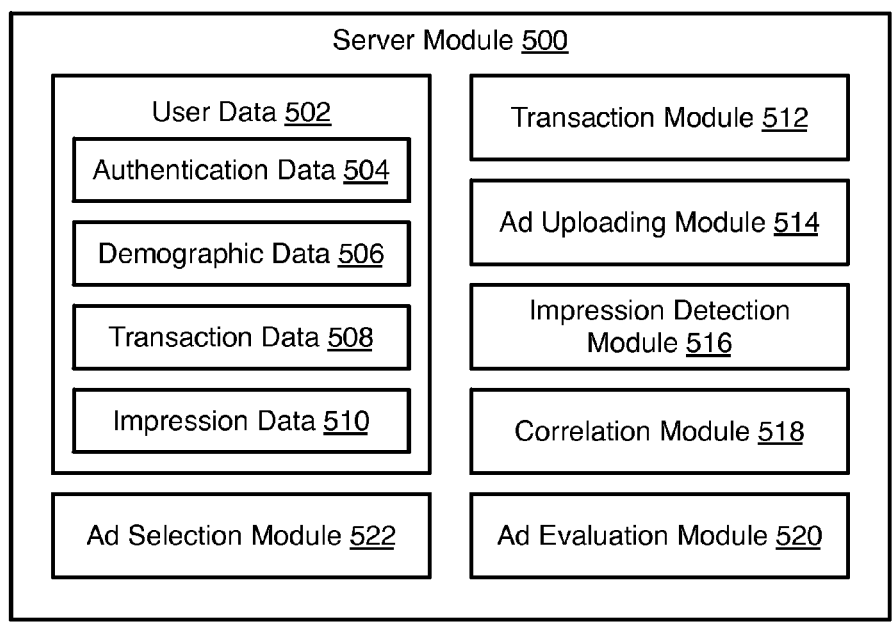
FIG. 5 is a schematic block diagram of a server module in accordance with an embodiment of the invention.

FIG. 5 illustrates a server module 500 that may be executed by a server system 102a or may be executed through an interface provided to a server system 102a. The server module 500 may host or access user data 502. The methods disclosed herein may be used in combination with a system in which transactions are reported by a POS 106a, 106b to a server system 102a. A reported transaction may include such information as a user identifier of the customer associated with the transaction, the products purchased, payment made, a method of payment, coupons used, or other information. An identifier of a customer associated with a transaction may be self-reported by a person conducting a transaction, such as by means of providing an optical code for scanning by the POS 106a, 106b, a code input by a person conducting the transaction or a cashier, or by some other means.

Reported transaction data may be stored or accessed by the server module 500. For example, the server module 500 may store or access user data 502 for particular users including such as authentication data 504 for enabling a user to access the user data, such as a username, password, user identifier or the like. The user data 502 may include demographic data 506 such as age, gender, income, interests, spending habits, or any other data that can be self reported or inferred from analysis of a user's transactions reported to the server module 500.

Transaction data 508 may also be stored in the user data 502 for particular customers. Transaction data may include some or all of the data reported by a POS 106a, 106b and may include summaries or analysis of this data. The user data 502 may additionally include impression data 510. Impression data 510 may include information regarding advertisements to which a customer associated with user data 502 was exposed on a display device 302. Impression data 510 may include for each identified advertisement to which a user was exposed such information as a product advertised in the identified advertisement, an identifier of the advertisement, an identifier of the display device 302 on which the identified advertisement was displayed, a location (e.g. zip code, city, state, etc.) where the identified advertisement was displayed or other information. Impression data 510 may additionally or alternatively include summaries or analysis of identified advertisements, such as a number of views of a particular advertisement in a given time interval, a number of impressions with respect to a particular product in a given time interval, or any other analysis of the timing and subject matters of advertising impressions ascribed to a display device 302. In some embodiments, impression data 510 may include data describing or summarizing the timing and subject matter of advertising impressions for a customer though other media that can be known with certainty, such as web advertisements, emailed advertisements, mailed advertisements, or the like.

The server module 500 may include a transaction module 512. The transaction module 512 may receive transaction data reported by a POS 106a, 106b and store the information, such as in association with the user data 502 for a customer identified in the received transaction data.

In embodiments where the server module 500 is also responsible for providing advertisements and advertisement schedules to display devices 302, a server module 500 may include an advertisement uploading module 514 that is operable to perform this function, including some or all of the functionality ascribed to the advertisement module 400. In embodiments where a separate entity performs the task of uploading content to display devices 302, an advertisement uploading module 514 my be programmed to retrieve advertisements and advertisement schedules from this entity.

An impression detection module 516 may be programmed to identify a time of a transactions for an individual customer, identify the POS 106a, 106b at which the identified transaction occurred, and identify which advertisements were being displayed at a display device 302 adjacent the identified POS 106a, 106b around the identified time. Methods for performing this task are described in greater detail below.

A correlation module 518 identifies correlations between advertising impressions and subsequent purchasing activity. For example, where an impression (which may be a set of impressions over a time interval) of a customer is identified for a particular product, the transaction data for the customer from a time before the impression to a time period after the impression may be analyzed by the correlation module 518 to identify any change in a volume of purchases, or volume of purchases per unit time, of the particular product before and after the impression.

An advertisement evaluation 520 may characterize an effectiveness of an advertisement based on identified correlations. For example, where, for a particular customer, an increase in a volume or rate of purchase of a product is identified after an impression, the amount of the increase may be evaluated to determine a metric of effectiveness. In some embodiments, the advertisement evaluation 520 may aggregate correlations for multiple customers in order to determine an advertisement's effectiveness. For example, the advertisement module 520 may identify, using the user data 502, consumer's belonging to a specific demographic group. The aggregate number of impressions for members of the demographic group may be compared to an aggregation of post-impression increases in purchases for the group in a given time interval post impression, with the amount of the aggregate increase in purchases to characterize effectiveness of an advertisement. Any other combination or evaluation of impression and post-impression increases for the demographic group may also be used to determine an aggregate effectiveness of an advertisement.

In some embodiments, an advertisement selection module 522 may generate recommendations for advertisements to be displayed to a particular customer, a particular display device 302, display devices 302 in a given area, or display devices 302 in general. For example, where a post-impression increase in transactions is identified for a customer for a particular product, products that are of the same brand, same product class, or suitable for use with the particular product may be identified as candidates for advertisements for that customer. In a like manner, where an advertisement for a particular product is found to be effective in general or for a particular demographic or geographic area, advertisements that have a similar attributes (e.g. style, format, music genre, actors etc.) or that are for a similar product, product belonging to the same class, or for use with a product that was the subject of the effective advertisement may be selected for display in the particular geographic area or to customers belonging to the particular demographic group.

Where an increase in purchases of a product corresponding to the impression is apparent from the transaction data, then the increase may be attributed to the impression. The amount of the increase may characterize the effectiveness of the impression. Identified increases for multiple consumers correlated to the same advertisement, such as consumers belonging to a particular demographic, may be aggregated to obtain an improved characterization of the impact of an advertisement.

Any method known in the art for selecting advertisements or advertised products according to known tastes of a customer may be used to select products or advertisements using tastes and impression-initiated purchasing behavior of a consumer may be used to select advertisements targeted to a consumer or a display device 302.

Figure 6:
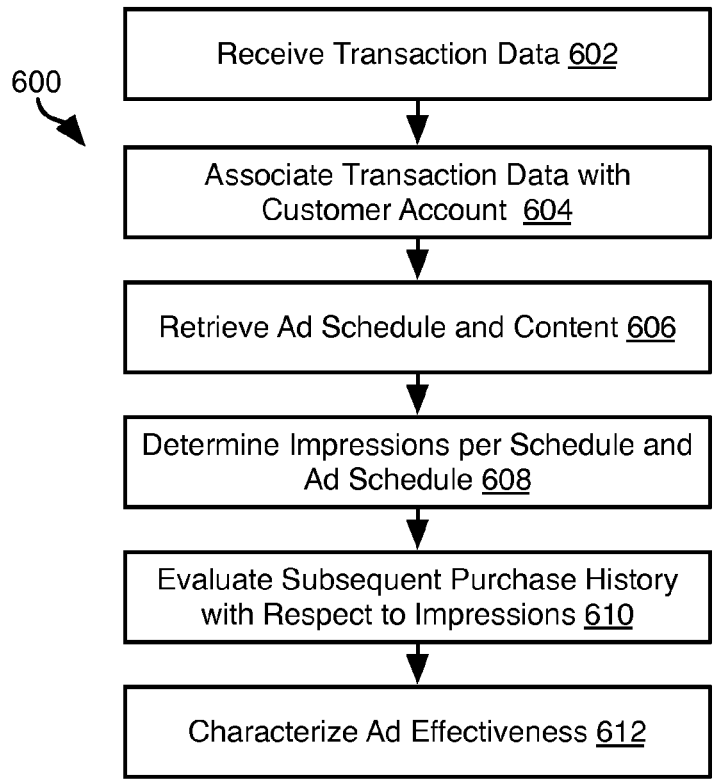
FIG. 6 is a process flow diagram of a method for characterizing the effectiveness of in-store advertisements in accordance with an embodiment of the invention.

FIG. 6 illustrates a method 600 for characterizing an advertisement's effectiveness. The method 600 may include receiving 602 transaction data for one or more transactions. As noted above, transaction data may be received from a POS 106a, 106b and may include a customer identifier, POS identifier, and other information such as a product purchased, price, payment method, or other information. The transaction data may also include a time at which a transaction was conducted.

The transaction data may be stored or otherwise associated 604 with account. This may include storing the transaction data with an identifier of a customer or storing the transaction data in a file or record associated with the customer identified in the transaction data.

An advertisement schedule and content may be retrieved 606 and, using the time reported for a transaction, one or more advertising impressions around the time of a transaction may be determined 608. Retrieving 606 an advertisement schedule and content may include retrieving such data corresponding to a POS 106a, 106b or location of a POS 106a, 106b identified using the received 602 transaction data.

In some embodiments, advertisements displayed a fixed time before the time a transaction was concluded may be inferred as having been viewed by a customer. Alternatively, an actual time before a transaction that a customer was in a queue and a display device was viewable by a customer may be determined and this time range used to determine with more precision which advertisements have a high probability of having been viewed and/or heard by a customer. Examples of methods for determining a time spent in a queue are described in greater detail with respect to FIGS. 8 and 9.

The method 600 may include evaluating 610 subsequent purchase history with respect to the determined impressions. For example, where an impression is determined 608 for a product, this may include identifying post-impression purchases of that product by the customer within a period after the impression or a frequency of purchase of that product per time period for a period after the impression. The time period during which post-impression transactions are evaluated may be selected based on the type of product. For example, where a product is bought on a weekly basis, one, two, or three weeks of post-impression transactions may be evaluated to identify purchases of the advertised product. In another example, where a product is bought on a monthly basis, one, two, or three months of post impression transactions may be analyzed to identify purchases of the advertised product.

Using the post-impression purchases identified according to the evaluation 610, the effectiveness of the determined 608 impression may be characterized 612. For example, for an amount or frequency of purchase of the advertised product during the period evaluated after the impression may be compared to an amount or frequency of purchase of the advertised product during a period of equal duration prior to the impression. The impression's effectiveness may be characterized in proportion or as a function of the amount of an increase in the amount or frequency of purchase of the advertised product from the pre-impression period to the post-impression period.

An advertisement's effectiveness as determined using the method 600, or any of the methods disclosed herein, may be used in any manner known in the art for. For example, an advertisement's effectiveness may be output on a display device for viewing, used to set rates for future advertisements, used to calculate a commission for an advertisement, select future advertisements, or any other purpose for which observed consumer behavior can be used as known in the art.

Figure 7:
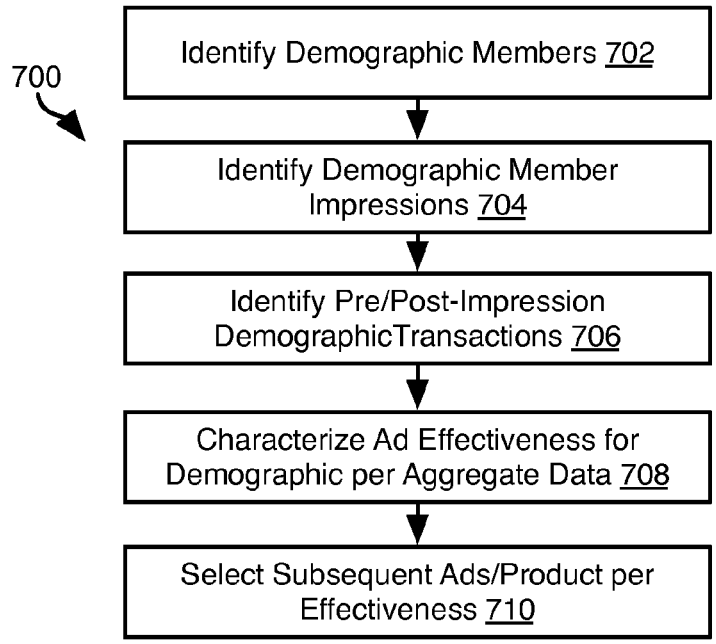
FIG. 7 is a process flow diagram of a method for determining effectiveness of an in-store advertisement for a demographic in accordance with an embodiment of the invention.

FIG. 7 illustrates a method 700 for characterizing an advertisements effectiveness for a group of people, such as a demographic group. The demographic group may include any group of individuals having a common attribute, such as a common residence, common gender, belonging to a common age range, or any other attribute. In some implementations, the method 700 may be executed with respect to the general population without regard to demography.

The method 700 may include identifying 702 members of a demographic group, such as using user data 502 collected for a number of customers. For the identified 702 customers, impressions may be identified 704 and pre- and post-impression transactions may be identified 706, such as in the same manner as described above with respect to the method 600.

The effectiveness of an advertisement may be characterized 708 according to an aggregation of impression data for the demographic members, an aggregation of pre-impression transactions for the demographic members, and an aggregation of post-impression transactions for the demographic members. For example, a number of pre-impression transactions for the demographic members may be summed, and a number of post-impression transactions for the demographic members may be summed. These sums may then be used to characterize an advertisement's effectiveness. For example an effectiveness may be calculated according to the equation $(S_{post}-S_{pre})/I$, where $S_{post}$ is the sum of post impression transactions, $S_{pre}$ is the sum of pre impression transactions, and I is the sum of impressions. Any other statistical method for characterizing a correspondence between an event and behavior may be used to characterize the effectiveness of an advertisement using the pre-impression transactions, impressions, and post-impression transactions.

In some embodiments, the method 700 may include selecting 710 advertisements for presenting to specific members, display devices 302, or display devices 302 within a specific region, or for presentation in another medium. Selecting 710 advertisements may include selecting advertisements that have a common attribute to an advertisement found to be effective, e.g. having effectiveness above a threshold level. A common attribute may include any attribute, such as colors used, actors used, type of music, a tone of an advertisement (e.g. sentimental, energetic, animals, celebrity endorsement), or any other attribute. Selecting 710 an advertisement may additionally or alternative include selecting an advertisement based on an advertised product or brand included in an advertisement. For example, an advertisement may be selected for an individual, demographic group, or general population, for a product that is of the same brand as the advertised product, a substitute for the advertised product, of the same product class or category as the advertised product, or for suitable for use with the advertised product.

Figure 8:
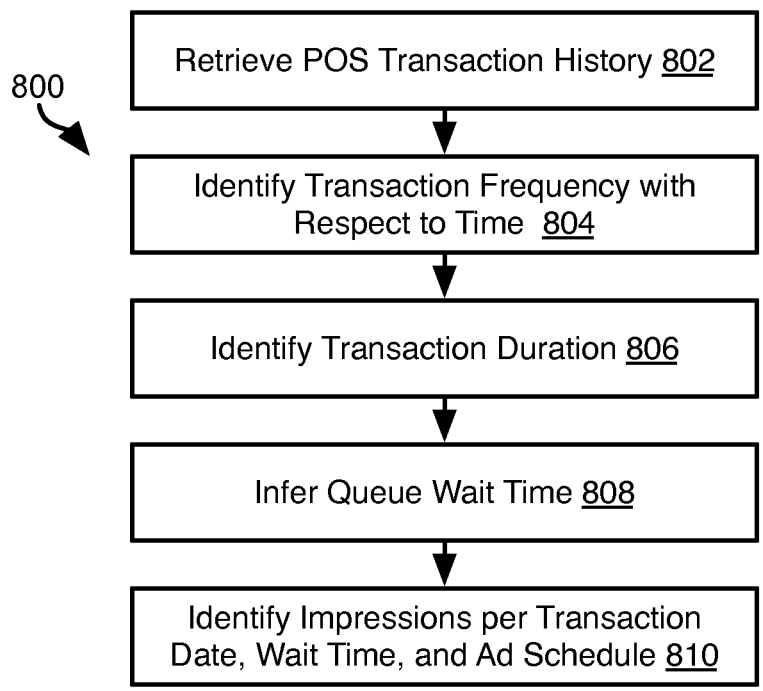
FIG. 8 is a process flow diagram of a method for determining advertising impressions using transaction data in accordance with an embodiment of the invention.
Figure 9:
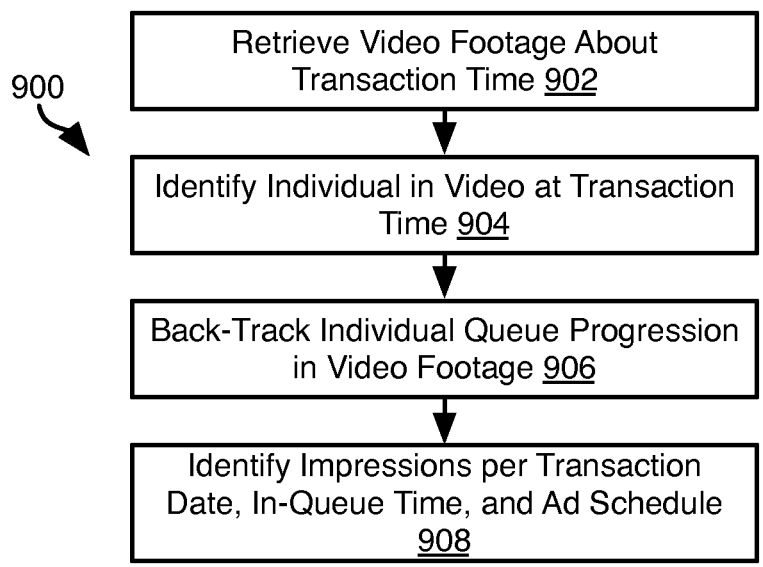
FIG. 9 is a process flow diagram of a method for determining advertising impressions using transaction and video data in accordance with an embodiment of the invention.

FIGS. 8 and 9 illustrate methods 800 and 900, respectively, for determining an amount of a time a customer spends in a queue and able to view a display device 302. Referring specifically to FIG. 8, the method 800 may be executed with respect to an individual transaction associated with a customer, the "tested transaction." The method 800 may include retrieving 802 a transaction history for the POS 106a, 106b at which the tested transaction took place. Retrieving 802 a transaction history may include retrieving 802 transactions from one or both of a time period before the tested transaction and a time period after the tested transaction. The time period may be chosen such that the duration of transactions and a wait time for the POS 106a, 106b can be inferred at the time of the tested transaction. For example, a period of between 5 minutes and 10 minutes, between 5 and 15 minutes, or some other period may be used.

The retrieved transactions may be evaluated to one or both of identify 804 an average transaction frequency and identify 806 an average transaction duration for the retrieved transactions. A high transaction frequency and/or high transaction duration may indicate a longer wait time. Likewise a low transaction frequency and/or low transaction duration may indicate a shorter wait time in a POS queue. A mathematical relationship between wait time and one or both of transaction frequency and transaction duration may be determined empirically by observation of actual wait times and POS transaction data.

Using this relationship, the identified frequency and or duration may be used to infer 808 a wait time at the time of the tested transaction. Using this wait time, a customer may be inferred to have been in the field of view of the display device 302 adjacent a particular POS 106a, 106b for a time period equal to the wait time ending, or including, the transaction time of the tested transaction. Accordingly, advertising impressions during this period may be identified 810 as those that were displayed during this period according to the advertisements and advertisement schedule for the display device 302 at the time of the tested transaction. The identified 810 impressions may then be used according to the methods described herein. In instances where a display device 302 is offset from its corresponding POS 106a, e.g. the configuration shown in FIG. 3B, the amount of time that the display device 302 is actually in the field of view of the customer will end some time prior to the actual time of the tested transaction. In such embodiments, the time range used to identify viewed transmissions may start at a first time offset from the time of the tested transaction by the wait time and a second time offset from the time of the tested transaction by a delay corresponding to an estimate of the time required to travel the distance between the display device 302 and the POS 106a. The amount of the offset may be determined empirically by observing transactions at a POS for a period of time and calculating an average value of the time required to travel this distance. Alternatively, the time required to travel this distance may be calculated according to a model that takes as input one or more parameters such as time of day, date, cashier identity, or other factors, where the model is trained based on observed times spent traveling this distance for various values of these paramters.

FIG. 9 illustrates a method 900 for determining wait time using video data. The method 900 may likewise be executed relative to a tested transaction with a known transaction time and corresponding POS 106a, 106b. The method 900 may include retrieving 902 video footage for a camera 306 having the POS 106a, 106b and the queue thereof in its field of view around the time of the tested transaction. For example, video footage for a time period between N, e.g. five, minutes prior to the transaction time and the transaction time may be retrieved. In some embodiments, video footage extending both before and after a transaction may be retrieved.

A frame of the retrieved video corresponding to transaction time, an individual adjacent the POS 106a, 106b may be identified 904, e.g. the individual that is at the front of the queue or otherwise located where a customer concluding a transaction would be located. In the retrieved footage, progression of the individual through the queue may be backtracked 906 to identify a time prior to the transaction time at which the individual one or more of entered a region that is known to be in view of the display device 302 corresponding to the POS 106a, 106b and entered the field of view of the camera 306. The time period between the time of entry to the field of view or other region and the transaction time may then be used as an in-queue time. The advertisements to which the customer was exposed during the in-queue may then be identified 908 from an advertisement schedule for advertisements displayed on the POS 106a, 106b as in other embodiments described herein and used in accordance with methods described herein.

The invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for evaluating the effectiveness of advertising, the method comprising:
   providing a server system in communication with one or more user computing devices and a plurality of point of sale (POS) stations located within a retail store and in communication with the server system, each of the plurality of POS stations including a camera, a POS device, and a video display device positioned in view of users queued to pay for purchases at the POS device;
   receiving from the POS stations, by the server system, notification of a first transaction, the transaction having a user identifier, POS station, and a time associated therewith from the POS device;
   retrieving, by the server system, advertising data referencing advertising displayed by the video display device at the POS station at the time associated with the first transaction;
   evaluating, by the server system, second transactions associated with the user identifier reported by the POS stations subsequent to the first transaction; and
   characterizing, by the server system, an effectiveness of advertising displayed by the video display device at the POS station at the time associated with the first transaction in accordance with the evaluation of the second transactions;
   wherein retrieving, by the server system, advertising data referencing advertising displayed by the video display device at the POS station at the time associated with the first transaction further comprises:
   comparing the time associated with the first transaction to an advertising schedule for the POS station; and
   wherein retrieving, by the server system, advertising data referencing advertising displayed by the video display device at the POS station at the time associated with the first transaction further comprises:
   retrieving video data from the camera at the POS station corresponding to the time associated with the first transaction:
   identifying an in-queue time for a user associated with the user identifier using the retrieved video data by identifying the time and duration in which the user associated with the user identifier is recorded by the camera in the video data; and
   retrieving the advertising data in accordance with advertising displayed by the video display device at the POS station during the in-queue time.

2. The method of claim 1, further comprising storing, by the server system, records of the first transaction and second transactions in a user account associated with the user identifier.

3. The method of claim 2, further comprising:
   receiving, by the server system, a request for access to the user account from one user computing device of the one or more user computing devices; and
   in response to the request for access, transmitting, by the server system, data from the user account to the one user computing device.

4. The method of claim 1, wherein retrieving, by the server system, advertising data referencing advertising displayed by the video display device at the POS station at the time associated with the first transaction further comprises:
   identifying an in-queue time for the user associated with the first transaction immediately prior to the first transaction in accordance with one or both of a transaction duration and transaction frequency at the POS station immediately prior to the first transaction; and
   retrieving the advertising data in accordance with advertising displayed by the video display device at the POS station during the in-queue time.

5. A system for evaluating the effectiveness of advertising, the system comprising:
   a server system including one or more processors and one or more memory devices operably coupled to the one or more processors, the server system in communication with one or more user computing devices;
   a plurality of point of sale (POS) stations located within a retail store and in communication with the server system, each of the plurality of POS stations including a camera, a POS device, and a video display device positioned in view of users queued to pay for purchases at the POS device;
   the one or more memory devices storing executable and operational code effective to cause the one or more processors to:
   receive from the POS stations notification of a first transaction, the transaction having a user identifier, POS station, and a time associated therewith from the POS device;
   retrieve advertising data referencing advertising displayed by the video display device at the POS station at the time associated with the first transaction;
   evaluating second transactions associated with the user identifier reported by the POS stations subsequent to the first transaction; and
   characterize an effectiveness of advertising displayed by the video display device at the POS station at the time associated with the first transaction in accordance with the evaluation of the second transactions;

wherein the executable and operational data are further effective to cause the one or more processors to retrieve advertising data referencing advertising displayed by the video display device at the POS station at the time associated with the first transaction by:

identifying a duration of in-queue time for the user associated with the first transaction immediately prior to the first transaction in accordance with one or both of a transaction duration and transaction frequency at the POS station immediately prior to the first transaction; and retrieving the advertising data in accordance with advertising displayed by the video display device at the POS station during a period preceding the first transaction based on the identified duration of in-queue time;

wherein the executable and operational data are further effective to cause the one or more processors to retrieve advertising data referencing advertising displayed by the video display device at the POS station at the time associated with the first transaction by:

retrieving video data from the camera at the POS station corresponding to the time associated with the first transaction;

identifying an in-queue time for a user associated with the user identifier by identifying the time and duration in which the user associated with the user identifier is recorded by the camera in the video data; and retrieving the advertising data in accordance with advertising displayed by the video display device at the POS station during the in-queue time.

6. The system of claim 5, wherein the executable and operational data are further effective to cause the one or more processors to store records of the first transaction and second transactions in a user account associated with the user identifier.

7. The system of claim 6, wherein the executable and operational data are further effective to cause the one or more processors to:

receive a request for access to the user account from one user computing device of the one or more user computing devices; and in response to the request for access, transmit data from the user account to the one user computing device.

8. The system of claim 5, wherein the executable and operational data are further effective to cause the one or more processors to retrieve advertising data referencing advertising displayed by the video display device at the POS station at the time associated with the first transaction by comparing the time associated with the first transaction to an advertising schedule for the POS station.

9. A method for evaluating advertising effectiveness, the method comprising:

providing a server system in communication with one or more user computing devices and a plurality of point of sale (POS) stations located within a retail store and in communication with the server system, each of the plurality of POS stations including a camera, a POS device, and a video display device positioned in view of users queued to pay for purchases at the POS device;

receiving, by the server system, first transaction records from the plurality of point of sale (POS) stations, each transaction record having a time and user identifier associated therewith from the POS device;

retrieving, by the server system, advertising data for a plurality of the video display device;

identifying, by the server system, advertising impressions associated with each first transaction record of the first transaction records in accordance with the times associated with the first transactions and the retrieved advertising data;

receiving, by the server system, second transaction records from the plurality of POS stations, the second transactions each having a time and user identifier associated therewith; and characterizing, by the server system, an effectiveness of the identified advertising impressions in accordance with the received second transactions;

wherein identifying, by the server system, advertising impressions associated with each first transaction record of the first transaction records in accordance with the times associated with the first transactions and the retrieved advertising data further includes-evaluating, for each first transaction, video data corresponding to the time associated with the each first transactions to identify an in-queue wait duration for a user associated with the user identifier of the each first transactions using the retrieved video data from the camera at the POS station by identifying the time and duration in which the user associated with the user identifier is recorded by the camera in the video data; and identifying advertising impressions in accordance with advertising displayed by the video display device at the POS station during the in-queue wait time duration.

10. The method of claim 9, wherein the first transaction records are associated with user's having a common demographic attribute.

11. The method of claim 9, further comprising selecting, by the server system, tailored advertisements according to the characterization of the effectiveness of the identified advertising impressions.

12. The method of claim 9, further comprising storing, by the server system, records of the first transactions and second transactions in a user account associated with the user identifiers associated therewith.

13. The method of claim 12, further comprising:

receiving, by the server system, a request for access to the user account from one user computing device of the one or more user computing devices; and in response to the request for access, transmitting, by the server system, data from the user account to the one user computing device.

14. The method of claim 9, wherein evaluating the video data corresponding to the times associated with the first transactions to identify in-queue wait durations for users associated with the user identifiers of the first transactions using the retrieved video data from the camera further comprises, for each first transaction:

evaluating the video data corresponding to the each first transaction to identify progression of a person along a queue of the POS station of the plurality of POS stations corresponding to the each first transaction, the video data corresponding to the each first transaction being output by the camera having in a field of view the queue;

evaluating the video data corresponding to the each first transaction to identify a time of the person being located at the POS station of the plurality of POS stations corresponding to the each first transaction;

evaluating the transaction data to identify that the each first transaction was conducted at the time of the person being located at the POS station of the plurality of POS stations corresponding to the each first transaction; and determining an in-queue wait time duration for the each first transaction according to the time of the person being located at the POS station and the progression of the person along the queue preceding the time of the person being located at the POS by identifying the time and duration in which the user associated with the user identifier is recorded by the camera in the video data.

15. The method of claim 14, wherein identifying advertising impressions in accordance with advertising displayed by the video display device at the POS station during the in-queue time comprises:
evaluating an advertising schedule to identify advertisements scheduled to be displayed by the video display device during the in-queue wait time duration preceding the time of the person being located at the POS station of the plurality of POS stations corresponding to the each first transaction on the video display device located at the POS station of the plurality of POS stations corresponding to the each first transaction.

\* \* \* \* \*